(12) United States Patent  (10) Patent No.: US 8,597,452 B2
Amundson  (45) Date of Patent: Dec. 3, 2013

(54) METHODS OF STRETCHING WET WIPES TO INCREASE THICKNESS

(75) Inventor: John David Amundson, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 533 days.

(21) Appl. No.: 11/932,207

(22) Filed: Oct. 31, 2007

(65) Prior Publication Data

US 2009/0107618 A1 Apr. 30, 2009

(51) Int. Cl.
 *B32B 38/04* (2006.01)
(52) U.S. Cl.
 USPC .............. 156/204; 156/229; 156/252
(58) Field of Classification Search
 None
 See application file for complete search history.

(56) References Cited

U.S. PATENT DOCUMENTS

| | | | |
|---|---|---|---|
| 3,338,992 A | 8/1967 | Kinney et al. | |
| 3,341,394 A | 9/1967 | Kinney et al. | |
| 3,502,763 A | 3/1970 | Hartman | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 3,949,128 A | 4/1976 | Ostermeier | |
| 4,100,324 A * | 7/1978 | Anderson et al. | 442/344 |
| 4,154,885 A | 5/1979 | Tecl et al. | |
| 4,187,343 A | 2/1980 | Akiyama | |
| 4,340,563 A | 7/1982 | Appel et al. | |
| 4,753,839 A | 6/1988 | Greenway | |
| 4,879,170 A * | 11/1989 | Radwanski et al. | 442/329 |
| 5,213,881 A | 5/1993 | Timmons et al. | |
| 5,281,207 A * | 1/1994 | Chmielewski et al. | 604/378 |
| 5,296,289 A * | 3/1994 | Collins | 428/198 |
| 5,350,624 A | 9/1994 | Georger et al. | |
| 5,494,736 A | 2/1996 | Willey et al. | |
| 5,560,793 A | 10/1996 | Ruscher et al. | |
| 5,626,571 A | 5/1997 | Young et al. | |
| 6,550,633 B2 | 4/2003 | Huang et al. | |
| 6,605,172 B1 * | 8/2003 | Anderson et al. | 156/199 |
| 6,612,462 B2 | 9/2003 | Sosalla et al. | |
| 6,673,358 B1 | 1/2004 | Cole et al. | |
| 7,022,201 B2 | 4/2006 | Anderson | |
| 2001/0036787 A1 | 11/2001 | Brennan | |
| 2003/0118776 A1 | 6/2003 | Anderson | |
| 2005/0230034 A1 * | 10/2005 | Arora et al. | 156/229 |
| 2005/0268442 A1 | 12/2005 | Moody | |

FOREIGN PATENT DOCUMENTS

| | | | |
|---|---|---|---|
| EP | 1215325 A1 | 6/2002 | |
| KR | 200171992 Y1 | 3/2000 | |
| KR | 20030078356 A | 10/2003 | |
| WO | WO 9937839 A1 * | 7/1999 | |

OTHER PUBLICATIONS

International Search Report and Written Opinion for PCT/IB2008/054259 dated May 20, 2009.
Cotton Fibers, available from http://www.engr.utk.edu/mse/Textiles/Cotton%20fibers.htm, last updated Apr. 2004.
Patel et al., "Nonwoven Technology for Unconventional Fabrics," pp. 9-10, 2011 (available at http://textInfo.files.wordpress.com/2011/10/nonwoven-fabrics1.pdf).

* cited by examiner

*Primary Examiner* — Barbara J Musser
(74) *Attorney, Agent, or Firm* — Armstrong Teasdale LLP

(57) ABSTRACT

Methods for stretching nonwoven substrate material to reduce the basis weight of the material while maintaining or increasing thickness is disclosed. Additionally, the stretched substrate materials provide the same or improved strength as compared to conventional nonwoven materials and provide a softer feel to the user's skin.

12 Claims, 2 Drawing Sheets

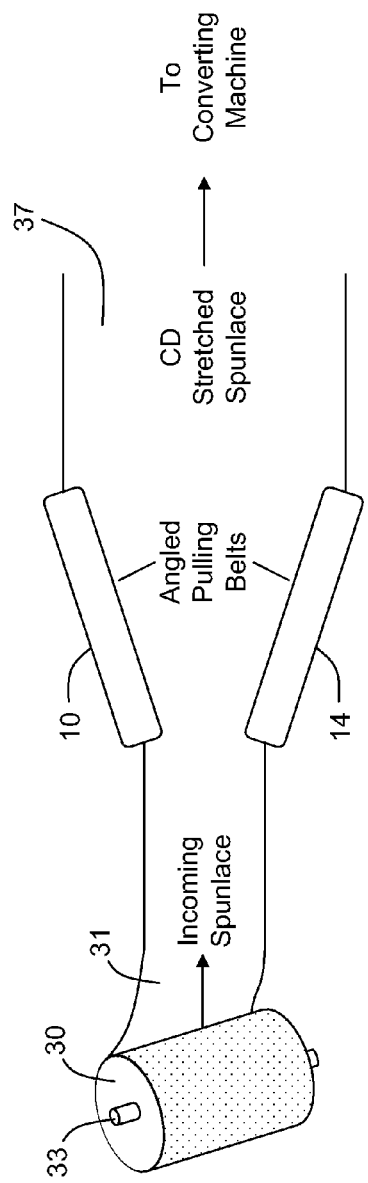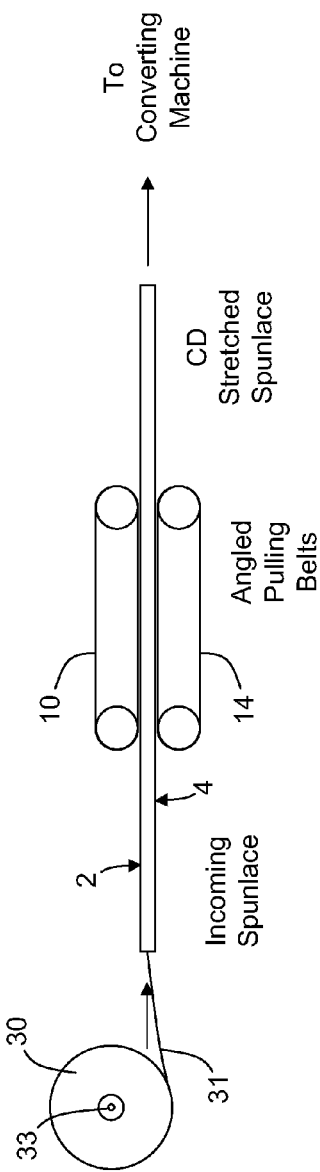

METHODS OF STRETCHING WET WIPES TO INCREASE THICKNESS

BACKGROUND OF DISCLOSURE

The present disclosure generally relates to methods of stretching substrate materials typically used for personal care products such as wet wipes. Specifically, the methods of stretching allow for substrate materials having increased thickness and decreased basis weight, which reduces fiber usage and costs of making the personal care products while still providing products having a soft desirable feel to the user.

Personal care products such as wet wipes are typically made from spunlace substrate materials, coform substrate materials, meltblown substrate materials, spunbond substrate materials, or combinations thereof. In recent years, however, due to increasing commodity prices, there has been a desire to reduce fiber usage of these materials.

It has been found that in reducing fiber usage, product strength and skin feel suffer. Specifically, products produced using less spunlace and/or coform fibers, have found to be weaker. The strength and coverage of a substrate material depends to a large extent on the basis weight of the material. Typically, substrate materials including spunlace and coform materials used in personal care products have a basis weight ranging from about 25 grams per square meter (gsm) to about 150 gsm to provide the desired strength and coverage. Unfortunately, while strength and coverage may be increased by increasing basis weight, the softness tends to decrease. Thus, it is a particular challenge to provide materials having each of these properties such that they are suitable for use in wet wipes.

As such, there is a need for a personal care product, such as a wet wipe, that can be produced using less fibers, and thus, having a reduced basis weight, while maintaining thickness of the product to create a soft desirable feel to the skin of the user. Additionally, it would be advantageous if the product was created to have a reduced basis weight and an increased thickness.

SUMMARY OF THE DISCLOSURE

It has been found that by stretching nonwoven materials such as spunlace and/or coform materials in the cross-direction during the wipe converting process, a reduced basis weight material can be produced, having the same or increased thickness as compared to conventional wipes. Specifically, in one embodiment, as the substrate material is being unwound from its parent roll, it is stretched in the cross-direction using either belts or rollers to produce a thicker wipe product having a reduced basis weight. In one particularly preferred embodiment, the substrate material is a spunlace substrate material and the material is stretched in the cross-direction by an amount of from about 5% to about 100% of its initial width. In another preferred embodiment, the substrate material is a coform substrate material and the material is stretched in the cross-direction by an amount of from about 5% to about 100% of its initial width.

As such, the present disclosure is directed to a method of stretching a spunlace substrate material to increase thickness and decrease basis weight of the material. The method comprises: providing a roll of spunlace substrate material; unwinding the spunlace substrate material from the roll; stretching the spunlace substrate material in the cross-direction; rolling the stretched spunlace substrate material; and folding the rolled stretched spunlace substrate material.

The present disclosure is further directed to a method of stretching a coform substrate material to increase thickness and decrease basis weight of the material. The method comprises: providing a roll of coform substrate material; unwinding the coform substrate material from the roll; stretching the coform substrate material in the cross-direction; rolling the stretched coform substrate material; and folding the rolled stretched coform substrate material.

Other objects and features will be in part apparent and in part pointed out hereinafter.

BRIEF DESCRIPTION OF THE DRAWINGS

FIG. 1a is a top view of one embodiment of a method of the present disclosure for stretching a substrate material.

FIG. 1b is a side view of the method of FIG. 1a.

Corresponding reference characters indicate corresponding parts throughout the drawings.

DETAILED DESCRIPTION OF THE DISCLOSURE

Figure 2:
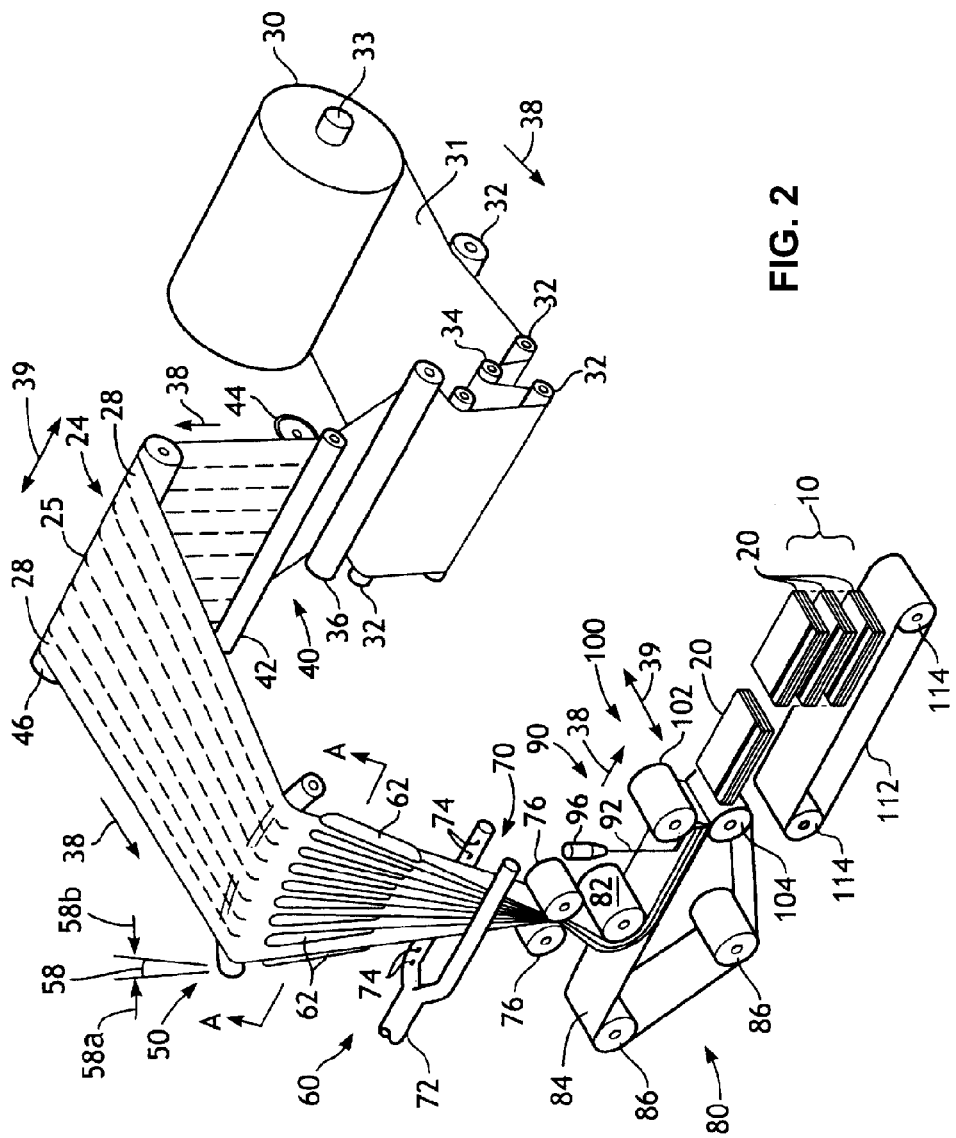
FIG. 2 is a view of one embodiment of a wipe converting process of the present disclosure.

The present disclosure is generally related to methods of stretching nonwoven substrate materials typically used for personal care products such as wet wipes, to allow for nonwoven substrate materials having increased thickness and decreased basis weight. "Nonwoven" and "nonwoven web", as used herein, refer to materials and webs of material that are formed without the aid of a textile weaving or knitting process. For example, nonwoven materials, fabrics or webs have been formed from many processes such as, for example, meltblowing processes, spunbonding processes, air laying processes, coform processes, and bonded carded web processes. The nonwoven substrate materials are stretched in the cross-direction during the wipe converting process.

Generally, the method of stretching the substrate material to increase thickness and decrease basis weight of the material includes: providing a roll of substrate material; unwinding the substrate material from the roll; stretching the substrate material in a cross-direction; rolling the stretched substrate material; and folding the rolled stretched substrate material.

As representatively shown throughout the figures, there is depicted an apparatus and method for stretching a substrate material to allow for an increased thickness and reduced basis weight. Starting on the left side of FIGS. 1a and 1b, there is a parent roll 30 of substrate material 31. The roll 30 can be supported by a roll support 33. In one embodiment, the substrate material is a spunlace substrate material. "Spunlace" refers to a means of bonding a web and involves entangling the fibers with high-pressure liquid jets along closely-spaced parallel lines. There are typically no bonding agents involved. Examples of spunlace materials include those described in U.S. Pat. No. 3,560,326 to Bunting, Jr., et al. and U.S. Pat. No. 3,485,706 to Evans.

Typically, the spunlace substrate material includes at least 10% (by weight) cellulosic fibers. More suitably, the spunlace substrate material includes from about 15% (by weight) to about 100% (by weight) cellulosic fibers and from about 0% (by weight) to about 85% (by weight) thermoplastic fibers and, even more suitably, the spunlace substrate material includes about 50% (by weight) cellulosic fibers and about 50% (by weight) thermoplastic fibers.

In another embodiment, the substrate material is a coform material. "Coform" refers to a blend of meltblown fibers and absorbent fibers such as cellulosic fibers that can be formed by air forming a meltblown polymer material while simultaneously blowing air-suspended fibers into the stream of meltblown fibers. The coform material may also include other materials, such as superabsorbent materials. The meltblown fibers and absorbent fibers are collected on a forming surface, such as provided by a belt. The forming surface may include a gas-pervious material that has been placed onto the forming surface. Two U.S. patents describing coform materials are U.S. Pat. No. 4,100,324 to Anderson et al. and U.S. Pat. No. 5,350,624 to Georger et al., both of which are incorporated in their entirety in a manner consistent herewith.

Typically, the coform substrate material includes at least 10% (by weight) cellulosic fibers. More suitably, the coform substrate material includes from about 15% (by weight) to about 85% (by weight) cellulosic fibers and from about 15% (by weight) to about 85% (by weight) thermoplastic fibers and, even more suitably, the coform substrate material includes about 70% (by weight) cellulosic fibers and about 30% (by weight) thermoplastic fibers.

Other suitable substrate materials can include meltblown substrate materials, spunbond substrate materials, and the like. "Meltblown" refers to fibers formed by extruding a molten thermoplastic material through a plurality of fine, usually circular, die capillaries as molten threads or filaments into converging high velocity gas (e.g., air) streams, generally heated, which attenuate the filaments of molten thermoplastic material to reduce their diameters. Thereafter, the meltblown fibers are carried by the high velocity gas stream and are deposited on a collecting surface or support to form a web of randomly dispersed meltblown fibers. Such a process is disclosed, for example, in U.S. Pat. No. 3,849,241 to Butin et al. Meltblowing processes can be used to make fibers of various dimensions, include macrofibers (with average diameters of about 40 to about 100 microns), textile-type fibers (with average diameters between about 10 and 40 microns), and microfibers (with average diameters less than about 10 microns). Meltblowing processes are particularly suited to making microfibers, including ultra-fine microfibers (with an average diameter of about 3 microns or less). A description of an exemplary process of making ultra-fine microfibers may be found in, for example, U.S. Pat. No. 5,213,881 to Timmons, et al. Meltblown fibers may be continuous or discontinuous and are generally self bonding when deposited onto a collecting surface. "Spunbond" refers to small diameter fibers which are formed by extruding molten thermoplastic material as filaments from a plurality of find, usually circular capillaries of a spinneret with the diameter of the extruded filaments then being rapidly reduced to fibers as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al., the contents of which are incorporated herein by reference to the extent they are consistent herewith. Spunbond fibers are generally continuous and have diameters generally greater than about 7 microns, more particularly, between about 10 and about 20 microns.

The substrate material 31 is unwound from the parent roll 30 and fed between a first set of driven belts 10 and a second set of driven belts 14. As shown in FIG. 1b, the first set of driven belts 10 is configured to contact a first side 2 of substrate material 31 and the second set of driven belts 14 is configured to contact a second opposing side 4 of the substrate material 31.

The first set of driven belts 10 and second set of driven belts 14 stretch the substrate material 31 in a cross-direction, thereby stretching the width of the substrate material. As shown in FIG. 1a, the first set of driven belts 10 and second set of driven belts 14 may be angled to allow for a further stretch of the substrate material in the cross-direction. It should be understood by one skilled in the art, however, that while as shown in FIG. 1a that preferably the belt sets are angled, the belt sets may be configured so as to not be angled without departing from the scope of the present disclosure.

Furthermore, while show in FIGS. 1a and 1b as using angled belt sets, the substrate material may be stretched using any other means known in the art without departing from the scope of the present disclosure. For example, in one alternative embodiment, the substrate material is stretched in the cross-direction using at least one roller. Specifically, the substrate material may be stretched in the cross-direction using two rollers, wherein a first roller is configured to contact the first side of the substrate material and the second roller is configured to contact the second side of the substrate material. Suitably, there may be more than two rollers, such as three rollers, four rollers, or even five rollers or more. As with the belt sets described above, the rollers may be configured at an angle to provide further stretch of the substrate material.

Typically, the substrate material is stretched in the cross-direction by an amount of from about 5% to about 100% of its initial width. More suitably, the substrate material is stretched in the cross-direction by an amount of from about 10% to about 80% of its initial width and, even more suitably, from about 15% to about 75% of its initial width.

Referring back to FIGS. 1a and 1b, once the substrate material 31 has been stretched to a desired width in the cross-direction using belt sets 10, 14, or rollers (not shown), the stretched substrate material 37 is fed to a converting machine for rolling, folding, packaging, and any further treatment of the stretched substrate material to produce a personal care product such as a wipe product.

In one embodiment, the personal care product produced is a wet wipe. "Wet wipe" refers to a wipe that includes greater than about 70% (by weight substrate) moisture content. In another embodiment, the personal care product is a dry wipe. "Dry wipe" refers to a wipe that includes less than about 10% (by weight substrate) moisture content. While, wet and dry wipe products have been defined herein, it should be understood that the wipe product can include any substrate having a moisture content in between the defined wet and dry wipe. Furthermore, the substrate materials can be treated or untreated. When treated, the substrate materials can be treated with any solution known in the art such as oil, water, solvent, lotion, and the like. Furthermore, laminated or plied together substrate materials of two or more layers of any of the described substrate materials are suitable.

A typical converting process for a wipe product is shown in FIG. 2. Specifically, the stretched substrate material 37 is fed through a series of advancing rollers such as idler rollers 32 and dancer roller 34. While FIG. 2 depicts rolling the stretched substrate material using at least one roller, it should be understood by one skilled in the art that the stretched substrate material may advance through the converting process using more than one roller, such as two rollers, or three roller, or even four rollers or more. Furthermore, one skilled in the art should recognize that, while FIG. 2 shows using rollers for advancing the stretched substrate material, devices other than rollers may be used, such as, for example, one or more driven belt sets without departing from the scope of the present disclosure. Specifically, in one alternative embodiment, the stretched substrate material is rolled through a first set of driven belts and a second set of driven belts. As during the stretching step described above, the first set of drive belts is typically configured to contact a first side of the stretched substrate material and the second set of drive belts is typically configured to contact a second opposing side of the stretched substrate material.

From there the stretched substrate material travels over an upper idler roller 46 and over to an arched roller assembly 50. The rolled stretched substrate material then travels into the folding assembly 60. The folding assembly includes a series of folding devices 62 that assist in folding the rolled stretched substrate material in the cross direction 39 in a controlled fashion to induce machine direction 38 folds. As the rolled stretched substrate material travels further down the folding assembly, the substrate material becomes corrugated to a point where the substrate material is compressed in the cross direction by means of nip rollers 76. At this point, the rolled stretched substrate material forms a single ribbon of fan folded sheets that then travels by a conveyor assembly 80 including a pull roller 82, support belt 84 and support rollers 86 which are an idler roller and a drive roller.

In one particularly preferred embodiment, as shown in FIG. 2, the rolled stretched substrate material 37 may further travel to a slitter assembly 40 where the rolled stretched substrate material is slit prior to folding the substrate material. The slitter assembly can include an anvil roller 42 and slitting blades 44 that form weakened lines 24 (e.g., perforated slitting blades that thereby form perforations 25) in the rolled stretched substrate material as it travels in the machine direction 38 through the slitting assembly. As a result of traveling through the slitting assembly, the rolled stretched substrate material is formed into a plurality of panels 28 joined to adjacent panels along the plurality of weakened lines 24.

In another particularly preferred embodiment, in which the personal care product is a wet wipe, as the rolled stretched substrate material, which may have been slit or not, travels down the folding assembly 60, it encounters a moistening assembly 70. Assembly 70 can include a bar 72 having ports 74 for imparting a liquid or solution onto the moving rolled stretched substrate material as it is folded into a fan folded ribbon of material.

A liquid or solution can be provided at a desired add-on rate and in a conventional manner to the bar 72 so it can be deposited through ports 74 to the moving rolled stretched substrate material. Such deposition of the liquid or solution could include spraying or drooling with a bar like 72, or could include alternate structures (not shown) for techniques such as printing, a bath, a flooded nip, or hollowed out folding devices with spray orifices that project fluid in a rather even horizontal plane as the rolled stretched substrate material moves by the devices.

Typically, when a liquid or solution is deposited onto the rolled stretched substrate material, the solution is deposited in an amount of from about 150% (by total weight substrate material) to about 600% (by total weight substrate material). More suitably, the solution is deposited in an amount of from about 250% (by total weight substrate material) to about 350% (by total weight substrate material).

A typically liquid or solution is a wet wipe formulation including water, emollients, surfactants, preservatives, chelating agents, pH adjusting agents, skin conditioners, fragrances, and combinations thereof. For example, one suitable wetting solution for use in the wet wipe of the present disclosure comprises about 98% (by weight) water, about 0.6% (by weight) surfactant, about 0.3% (by weight) humectant, about 0.3% (by weight) emulsifier, about 0.2% (by weight) chelating agent, about 0.35% (by weight) preservative, about 0.002% (by weight) skin conditioning agent, about 0.03% (by weight) fragrance, and about 0.07% (by weight) pH adjusting agent. One specific wetting solution suitable for use in the wet wipe of the present disclosure is described in U.S. Pat. No. 6,673,358, issued to Cole et al. (Jan. 6, 2004), which is incorporated herein by reference to the extent it is consistent herewith.

Alternatively, if a dry final product (e.g., dry wipe) is desired the moistening assembly can be eliminated and otherwise the manufacturing apparatus and process could be the same.

In one embodiment, as shown in FIG. 2, the folded stretched substrate material may further continue to travel to an adhesive application assembly 90. The adhesive assembly applies adhesive 92 via an adhesive nozzle 96 to the top of the ribbon, e.g., along an edge of the folded stretched substrate material. One particularly preferred adhesive is a hot melt adhesive such as is commercially available under the tradename RT 2730 APAO (Huntsman Polymers Corporation, Odessa, Tex.). Typically, the amount of adhesive applied to the folded stretched substrate material can be any suitable amount known in the art. For example, the adhesive can suitably be applied to the folded stretched substrate material in an amount of from about 0.1 milligrams of adhesive per clip (as described below) to about 5.0 milligrams of adhesive per clip. Even more suitably, the adhesive can be applied to the folded stretched substrate material in an amount of from about 0.3 milligrams of adhesive per clip to about 1.2 milligrams of adhesive per clip. In one particularly preferred embodiment, about 0.6 milligrams of adhesive is applied per clip (as described below) of folded stretched substrate material.

Adhesive can be applied by various techniques known to those of skill in the art. For example, when the sheets comprise wet wipes, some such ways are described in a U.S. Pat. No. 6,550,633, issued to Huang, et al. (Apr. 22, 2003), which is assigned to the same assignee of this application and is incorporated herein by reference to the extent it is consistent herewith.

Additionally, as shown in FIG. 2, the folded stretched substrate material, with adhesive applied thereto, may travel on to a cutter assembly 100, which includes a rotary cutter 102 and anvil roller 104. The substrate material is then cut into discrete pieces, called clips 20, which then pass to a stacker assembly 110. The stacker assembly includes a stacker belt 112 and stacker rollers 114 which are an idler roller and a drive roller. In the stacker assembly 110, the clips 20 are stacked one upon the other and thereby the adhesive 92 on the top sheet of a clip adheres to a bottom sheet of the subsequent clip that is stacked on top of it. A desired number of clips are stacked one on top of another and adhesively joined in this manner. An example of such an apparatus for use as the stacker assembly is provided with a variety of conventional wet wipe machines sold by Paper Converting Machine Company of 2300 S. Ashland Ave., Green Bay, Wis. 54307, under the tradename Triton™ Wet Wipes Machine. Other stackers that could be employed are those supplied with a ZFV™ folder, sold by Elsner Engineering of Hanover, Pa. USA or a Serv-O-Tec™ folder sold by Serv-O-Tec in Lagenfeld Germany (Serv-O-Tec is a division of Bretting Mfg. in Ashland Wis., USA). Then, the completed stack is moved to a packaging assembly (not shown) where the clips can be put in various types of dispensers (e.g., tubs, bags, etc.) and then made ready for commercial sale and use.

As noted above, the methods of stretching the substrate material, as described above, will reduce the basis weight of the material and maintain, or even increase, the thickness of the material. Specifically, by increasing thickness and reducing the basis weight of the material, the material has a softer feel to the user.

It has been found that the increased thickness is due to the cross-direction stretching of the substrate material, which causes the staple fibers of the material to become more oriented in the z-direction. Specifically, in a typical hydroentangling process (such as for making spunlace substrate materials and the like), staple fibers are forced to lay flat within an x-y plane using high pressure water jets. When the fibers are stretched into the cross-direction, the fibers become more oriented in the z-direction and are angled upwards and downwards. When a substrate sheet material is produced containing fibers that are angled in the upwards and downwards directions instead of lying flat, the material becomes thicker.

To measure thickness, the thickness of a sample of unstretched substrate material (referred to as initial basis weight) is measured using a device such as a Mitutoyo Digimatic Indicator (code 543-445-1, type id-1050ME) and a 3" diameter circular platen exerting a pressure of about 0.05 psi (both commercially available from Mitutoyo America Corporation, Aurora, Ill.). The sample is then stretched in the cross-direction, and the thickness re-measured. Typically, the folded stretched substrate material, when stretched in the cross-direction by about 10% of its initial width, has an increased thickness of from about 5% to about 98% of its initial thickness. More suitably, when stretched in the cross-direction by about 10% of its initial width, the folded stretched substrate material has an increased thickness of from about 10% to about 50% of its initial thickness. It was found that as an increased amount of cross-directional stretch was applied to the substrate material, a greater increase in thickness was realized.

In addition to having an increase in thickness, the folded stretched substrate material has a reduced basis weight. To measure basis weight, the length and width of a sample of unstretched substrate material is measured with a ruler and the mass of the sample is weighed using a digital balance. The basis weight of the unstretched sample (referred to as initial basis weight) is then calculated using the above values. The sample is then stretched in the cross-direction and the basis weight of the stretched sample is determined. Typically, when the folded stretched substrate material has been stretched in the cross-direction by an amount of about 50% of its initial width, the substrate material has a decrease in basis weight of from about 5% to about 33% of its initial basis weight. More suitably, when the folded stretched substrate material has been stretched in the cross-direction by an amount of about 50% of its initial width, the substrate material has a decrease in basis weight of from about 15% to about 33% of its initial basis weight. It is thought that the more the substrate material is stretched in the cross-direction, the greater the decrease in the material's basis weight.

Typically, with the greater decrease in basis weight, however, as noted above, coverage of the material also decreases. Surprisingly, however, while there was a reduced basis weight of the substrate material stretched using the methods of the present disclosure, the coverage of the material was maintained. Specifically, the shape of the stretched substrate material is surprisingly maintained during and subsequent to stretching in the cross-direction. Currently used spunlace materials are easily stretched in the cross-direction, and thus, easily deformed. By pre-stretching the substrate material; that is, by stretching the material prior to converting the material, however, it was discovered that the inherent elongation of the material is consumed in the stretching process, thereby allowing for the material to better maintain its shape.

The present disclosure is illustrated by the following examples which are merely for the purpose of illustration and are not to be regarded as limiting the scope of the disclosure or manner in which it may be practiced.

Example 1

In this example, specimens of a spunlace substrate material were obtained and the thicknesses and basis weights of the specimens, both unstretched and then after being stretched, were analyzed.

Specifically, five specimens of Pampers Sensitive baby wipes (available from Procter & Gamble, Cincinnati, Ohio) (7.9"×6.8") were obtained. The thicknesses and basis weights of the five specimens were determined using the methods described herein. The specimens were then stretched by hand in the cross-direction by an amount of 50% greater than their initial widths. The thicknesses and basis weights of five separate specimens for each stretched sample were again measured, and then values for both thicknesses and basis weights were averaged. The results are shown in Table 1.

TABLE 1

| Specimen | Initial | | After Stretch | |
| --- | --- | --- | --- | --- |
| | Thickness (mm) | Basis Weight (gsm) | Thickness (mm) | Basis Weight (gsm) |
| A | 0.59 | 66.8 | 1.07 | 50.9 |
| B | 0.63 | 67.9 | 1.2 | 54.3 |
| C | 0.64 | 62.4 | 1.16 | 50.5 |
| D | 0.62 | 66.8 | 1.15 | 50.8 |
| E | 0.66 | 68.9 | 1.08 | 56.4 |

As shown in Table 1, each specimen increased in thickness and had a reduced basis weight when stretched 50% in the cross-direction. Specifically, each specimen increased thickness by at least 60% of its initial thickness. Additionally, each specimen decreased in basis weight by about 18% or more.

Example 2

In this Example, various samples of spunlace substrate materials were obtained and the thicknesses of the samples, both unstretched and then after being stretched, were analyzed.

Specifically, eight spunlace substrate material samples (4"×5") were obtained. The thicknesses of five separate specimens for each sample were determined using the methods described herein and then averaged. The specimens were then stretched by hand in the cross-direction by an amount of 10% greater than their initial widths. The thicknesses for each stretched specimen were again measured, and then values were averaged. The specimens were then further stretched to about 25% greater than their initial width and the thicknesses were again measured. The eight samples, their commercial sources, and the average thickness results are shown in Table 2.

TABLE 2

| Sample | Commercial Source | Initial Thickness (mm) | After 10% Stretch Thickness (mm) | After 25% Stretch Thickness (mm) |
|---|---|---|---|---|
| Nivea Sensitive | Beiersdorf (Germany) | 0.76 | 0.80 | 0.94 |
| Johnson's Baby Skincare Fragrance Free | Johnson & Johnson (New Brunswick, New Jersey) | 0.64 | 0.71 | 0.79 |
| Luvs Ultra Clean Wipes | Procter & Gamble (Cincinnati, Ohio) | 0.72 | 0.82 | 0.97 |
| Pampers Baby Fresh | Procter & Gamble (Cincinnati, Ohio) | 0.64 | 0.72 | 0.88 |
| Pampers Sensitive | Procter & Gamble (Cincinnati, Ohio) | 0.64 | 0.73 | 0.97 |
| Pampers Swipers | Procter & Gamble (Cincinnati, Ohio) | 0.69 | 0.78 | 1.03 |
| White Cloud Natural Aloe Unscented | Wal*Mart (Bentonville, Arkansas) | 0.60 | 0.68 | 0.86 |
| Parent's Choice All Purpose Wipes | Wal*Mart (Bentonville, Arkansas) | 0.51 | 0.62 | 0.83 |

As shown in Table 2, each sample increased in thickness when stretched 10% and 25% in the cross-direction. Specifically, each sample increased in thickness by at least about 5% of its initial thickness when stretched 10% in the cross-direction, and each sample increased thickness by at least 23% of its initial thickness when stretched 25% in the cross-direction.

Having described the invention in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products without departing from the scope of the disclosure, it is intended that all matter contained in the above description and shown in the accompanying drawings shall be interpreted as illustrative and not in a limiting sense.

What is claimed is:

1. A method of stretching a nonwoven substrate material to increase thickness and decrease basis weight of the material, the method comprising:
   providing a roll of substrate material, wherein the substrate material comprises about 50% (by weight) cellulosic fibers and about 50% (by weight) thermoplastic fibers;
   unwinding the substrate material from the roll;
   stretching the unwound substrate material in a cross-direction, wherein the shape of the stretched substrate material is maintained during and subsequent to stretching in the cross-direction;
   advancing the stretched substrate material using at least one of an advancing roller and a belt set;
   slitting the advanced stretched substrate material;
   folding the advanced stretched substrate material;
   applying an adhesive composition to an outer surface of the folded stretched substrate material; and
   cutting the folded stretched substrate material into discrete sheets and adhesively joining the sheets using the adhesive composition,
   wherein, when stretched in the cross-direction by about 50% of the nonwoven substrate material's initial width, the material has a decrease in basis weight of from about 5% to about 33% of its initial basis weight.

2. The method as set forth in claim 1 wherein the substrate material is stretched in the cross-direction by an amount of from about 5% to about 100% of its initial width.

3. The method as set forth in claim 1 wherein the folded stretched substrate material, when stretched in the cross-direction by about 10% of its initial width, has an increased thickness of from about 5% to about 98% of its initial thickness.

4. A method of stretching a spunlace substrate material to increase thickness and decrease basis weight of the material, the method comprising:
   providing a roll of spunlace substrate material, wherein the spunlace substrate material comprises about 50% (by weight) cellulosic fibers and about 50% (by weight) thermoplastic fibers;
   unwinding the spunlace substrate material from the roll;
   stretching the unwound spunlace substrate material in a cross-direction;
   advancing the stretched spunlace substrate material using at least one of an advancing roller and a belt set; and
   folding the advanced stretched spunlace substrate material,
   wherein, when stretched in the cross-direction by about 50% of the nonwoven substrate material's initial width, the material has a decrease in basis weight of from about 5% to about 33% of its initial basis weight.

5. The method as set forth in claim 4 wherein the spunlace substrate material is stretched in the cross-direction by an amount of from about 5% to about 100% of its initial width.

6. The method as set forth in claim 5 wherein the spunlace substrate material is stretched in the cross-direction using a first set of driven belts and a second set of driven belts, wherein the first set of driven belts is configured to contact a first side of the substrate material and the second set of driven belts is configured to contact a second opposing side of the substrate material.

7. The method as set forth in claim 5 wherein the spunlace substrate material is stretched in the cross-direction using at least one roller.

8. The method as set forth in claim 4 wherein the folded stretched spunlace substrate material, when stretched in the cross-direction by about 10% of its initial width, has an increased thickness of from about 5% to about 98% of its initial thickness.

9. The method as set forth in claim 5 further comprising slitting the rolled stretched spunlace substrate material prior to folding the substrate material.

10. The method as set forth in claim 5 further comprising moistening the rolled stretched spunlace substrate material simultaneously with folding the rolled stretched spunlace substrate material.

11. The method as set forth in claim 5 further comprising cutting the folded stretched spunlace substrate material into discrete sheets and adhesively joining the sheets using an adhesive composition.

12. The method as set forth in claim 11 wherein the adhesive composition is applied to an outer surface of the folded stretched substrate material prior to cutting the folded stretched spunlace substrate material.

* * * * *